United States Patent
Wang et al.

(10) Patent No.: US 11,951,814 B2
(45) Date of Patent: Apr. 9, 2024

(54) INTELLIGENT GLASS AND INTELLIGENT WINDOW SYSTEM

(71) Applicant: BOE Technology Group Co., Ltd., Beijing (CN)

(72) Inventors: Yongbo Wang, Beijing (CN); Chen Meng, Beijing (CN); Zhong Hu, Beijing (CN); Yutao Tang, Beijing (CN); Wenjie Zhong, Beijing (CN); Dahai Hu, Beijing (CN); Wei Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 81 days.

(21) Appl. No.: 17/043,944

(22) PCT Filed: Sep. 26, 2019

(86) PCT No.: PCT/CN2019/108195
§ 371 (c)(1),
(2) Date: Sep. 30, 2020

(87) PCT Pub. No.: WO2021/056340
PCT Pub. Date: Apr. 1, 2021

(65) Prior Publication Data
US 2023/0131509 A1  Apr. 27, 2023

(51) Int. Cl.
*B60J 3/04* (2006.01)
*B60K 37/06* (2006.01)

(52) U.S. Cl.
CPC ............ *B60J 3/04* (2013.01); *B60K 37/06* (2013.01); *B60K 2370/1434* (2019.05); *B60K 2370/785* (2019.05)

(58) Field of Classification Search
CPC .... B60J 3/04; B60K 37/06; B60K 2370/1434; B60K 2370/785
(Continued)

(56) References Cited

U.S. PATENT DOCUMENTS

| 2002/0135881 A1* | 9/2002 | Rukavina ............ B64C 1/1492 |
| | | 359/603 |
| 2013/0128333 A1* | 5/2013 | Agrawal ................ G02F 1/161 |
| | | 359/267 |

(Continued)

FOREIGN PATENT DOCUMENTS

| CN | 105183218 A | 12/2015 |
| CN | 105322938 A | 2/2016 |

(Continued)

OTHER PUBLICATIONS

Extended European Search Report dated Sep. 15, 2022 for application No. EP19945461.2.
(Continued)

*Primary Examiner* — William Choi
(74) *Attorney, Agent, or Firm* — Nath, Goldberg & Meyer; Joshua B. Goldberg

(57) ABSTRACT

The embodiments of the disclosure provide an intelligent glass and an intelligent window system, and relates to the technical field of window display. The intelligent glass of the disclosure includes a touch display assembly and a glass assembly. The touch display assembly is communicatively coupled to the glass assembly, and is configured to send a corresponding dimming instruction to the glass assembly based on a received touch instruction, such that the glass assembly adjusts its light transmittance based on the dimming instruction.

14 Claims, 4 Drawing Sheets

(58) Field of Classification Search
USPC .................................................. 359/265–275
See application file for complete search history.

(56) References Cited

U.S. PATENT DOCUMENTS

2015/0370140 A1  12/2015  Bertolini
2019/0113776 A1   4/2019  Ibrahim et al.

FOREIGN PATENT DOCUMENTS

| CN | 207257311 U    | 4/2018  |
|----|----------------|---------|
| CN | 108336122 A    | 7/2018  |
| CN | 207955282 U    | 10/2018 |
| CN | 110164928 A    | 8/2019  |
| DE | 102017214626 A1 | 2/2019 |
| JP | 2005146766 A   | 6/2005  |

OTHER PUBLICATIONS

Office Action dated Mar. 17, 2023 issued in corresponding Chinese Application No. 201980001814.8.

* cited by examiner

INTELLIGENT GLASS AND INTELLIGENT WINDOW SYSTEM

This is a National Phase Application filed under 35 U.S.C. 371 as a national stage of PCT/CN2019/108195, filed Sep. 26, 2019, the content of which is hereby incorporated by reference in its entirety.

TECHNICAL FIELD

The disclosure relates to the technical field of window display, and particularly relates to an intelligent glass and an intelligent window system.

BACKGROUND

A dimming glass is also called an electric control dimming glass, an electric control liquid crystal glass, an intelligent dimming glass and the like, and is a functional sandwich glass product formed by sandwiching a high-tech liquid crystal film between two layers of glass to be processed at a high temperature and a high pressure. For example, according to different control means and principles, the dimming glass can be switched between a transparent state and an opaque state by various modes such as electric control, temperature control, light control, pressure control and the like. Due to the limitation of various conditions, the dimming glass for realizing mass production in the current market is mostly a dimming glass of an electric control type. For example, when the dimming glass is powered off, liquid crystal molecules in the dimming glass are in an irregular dispersion state, and the electric control dimming glass presents a light transmissive and opaque appearance; when the dimming glass is powered on, the liquid crystal molecules in the dimming glass are arranged orderly, light can penetrate through the liquid crystal molecules freely, and the dimming glass presents a transparent state instantly.

SUMMARY

The embodiments of the disclosure aim to solve at least one of the technical problems existing in the prior art, and provide an intelligent glass and an intelligent window system.

In one aspect, the embodiments of the disclosure provide an intelligent glass which includes: a touch display assembly and a glass assembly, wherein the touch display assembly is communicatively coupled to the glass assembly, and is configured to send a corresponding dimming instruction to the glass assembly based on a received touch instruction, such that the glass assembly adjusts its light transmittance based on the dimming instruction.

Optionally, the touch display assembly includes a touch component, a display component and a first controller; wherein the display component includes: a plurality of pixel units and a plurality of driving units, wherein the driving units are configured to drive the pixel units for display under control of the first controller; and the touch component includes: a plurality of touch units, wherein the plurality of touch units are configured to send a corresponding touch signal to the first controller based on the received touch instruction, such that the first controller sends the dimming instruction to the glass assembly based on the touch signal.

Optionally, the first controller is configured to control the driving units to drive the pixel units to generate a plurality of light emitting points; the touch units are provided at areas corresponding to areas where the light emitting points are located; wherein the first controller is configured to send a different dimming instruction when the first controller receives a touch signal sent by the touch units provided in areas where different light emitting points are located.

Optionally, the pixel unit includes a light emitting device, and the light emitting device includes an electroluminescent device.

Optionally, the touch unit includes a capacitive touch unit.

Optionally, the glass assembly includes a dye intelligent glass and a second controller; wherein the second controller is communicatively coupled to the first controller, and is configured to adjust light transmittance of the dye intelligent glass based on the dimming instruction sent by the first controller.

Optionally, the first controller and the second controller are coupled to each other by a bus.

Optionally, the first controller and the second controller are integrated in a same controller.

Optionally, the intelligent glass further includes a power module configured to supply power to the touch display assembly and the glass assembly.

Optionally, the power module includes: a power unit configured to supply a standard power supply voltage; and a power isolator configured to isolate a voltage higher than the standard power supply voltage, and to convert the standard power supply voltage into a voltage required by the touch display assembly and the glass assembly.

Optionally, the touch display assembly includes a transparent touch display assembly.

Optionally, the touch display assembly is stacked on the dimming glass.

Optionally, the glass assembly includes any one of a dye liquid crystal dimming glass, an organic electrochromic dimming glass, and an inorganic electrochromic dimming glass.

In second aspect, the embodiments of the disclosure provide an intelligent window system including the intelligent glass as above.

DETAILED DESCRIPTION

In order to enable those skilled in the art to better understand the technical solution of the disclosure, the disclosure will be further described in detail below in combination with the attached drawings and specific embodiments.

Unless otherwise defined, the technical or scientific terms used in the disclosure shall have the general meaning understood by those with general skills in the all to which the disclosure belongs. "First", "second" and similar words used in the present disclosure do not indicate any order, quantity or importance, but are only used to distinguish different components. Similarly, "one", "a" or "the" and the like do not indicate a quantitative limit, but rather the existence of at least one. "Include" or "comprise" and other similar words mean that the elements or objects appearing before the word cover the elements or objects appearing after the word and their equivalents, without excluding other elements or objects. Words like "connect" or "couple" are not limited to physical or mechanical connections, but can include electrical connections, whether direct or indirect. "Up", "down", "left", "right" and so on are only used to represent the relative position relationship, and when an absolute position of the described object changes, the relative position relationship may also change accordingly.

Figure 1:
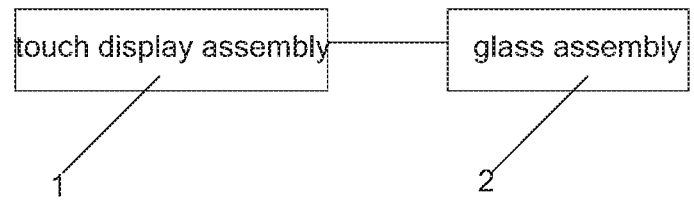
FIG. 1 is a schematic diagram of a structure of an intelligent glass according to an embodiment of the present disclosure.

FIG. 1 is a schematic diagram of a structure of an intelligent glass according to an embodiment of the present disclosure.

In a first aspect, embodiments of the present disclosure provide an intelligent glass, which may be applied to windows of automobiles, trains, airplanes, and the like. Referring to FIG. 1, the intelligent glass mainly includes a touch display assembly 1 and a glass assembly 2. The touch display assembly 1 is communicatively coupled to the glass assembly 2, and when receiving a touch instruction, the touch display assembly 1 sends a corresponding dimming instruction to the glass assembly 2, such that the glass assembly 2 adjusts its light transmittance based on the dimming instruction.

Since the intelligent glass in the embodiments of the present disclosure includes the touch display assembly 1, the light transmittance of the glass assembly 2 can be adjusted in a touch mode, such that the light transmittance of the intelligent glass can be adjusted more conveniently, and the intelligent glass can be applicable to more fields. Moreover, as the name implies, the touch display assembly 1 not only has a touch function, but also has a display function. That is, the intelligent glass in the embodiment of the present disclosure not only has an adjustable light transmittance, but also has a display function, such that user experience can be improved.

It should be noted that, a main function of the intelligent glass in the embodiment of the present disclosure is the glass function, and in order to prevent the touch display assembly 1 from affecting the glass function of the intelligent glass, the touch display assembly 1 may be designed as a transparent touch display assembly 1. Certainly, a proportion of the touch display assembly 1 and the glass assembly 2 may be designed according to a specific application scene of the intelligent glass.

The touch instruction in the embodiment of the present disclosure refers to touch information generated when a user touches the touch display assembly 1.

Figure 2:
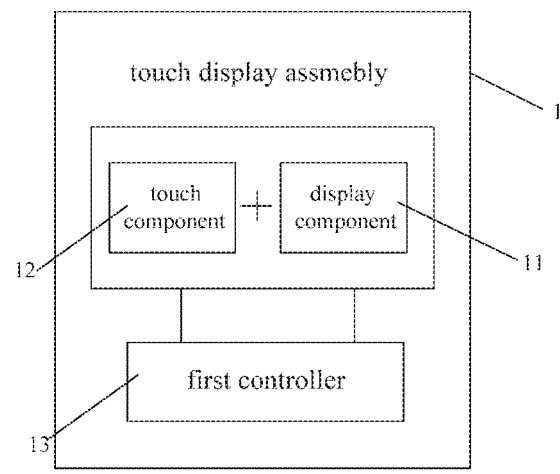
FIG. 2 is a schematic diagram of a structure of a touch display assembly according to an embodiment of the disclosure.

FIG. 2 is a schematic diagram of a structure of a touch display assembly according to an embodiment of the disclosure.

In some embodiments of the present disclosure, referring to FIG. 2, the touch display assembly 1 may specifically include a touch component 12, a display component 11, and a first controller 13.

Figure 3:
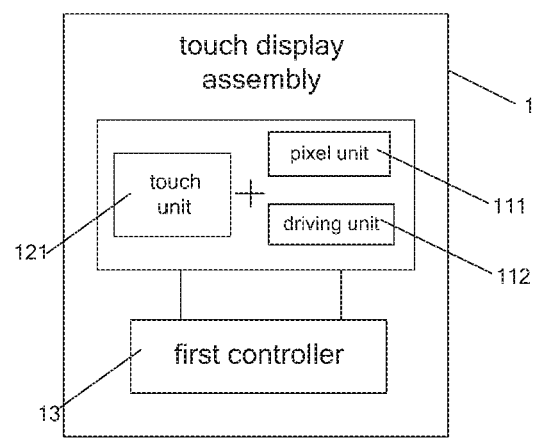
FIG. 3 is a schematic diagram of another structure of a touch display assembly according to an embodiment of the disclosure.

FIG. 3 is a schematic diagram of another structure of the touch display assembly 1 according to an embodiment of the disclosure. Referring to FIG. 3, the display component 11 includes a plurality of pixel units 111 and a plurality of driving units 112. The driving unit 112 can drive the pixel unit 111 to display according to a control signal sent by the first controller 13.

The touch component 12 includes a plurality of touch units 121, and the touch unit 121 is configured to send a corresponding touch signal to the first controller 13 according to the touch instruction received by the touch unit 121, such that the first controller 13 sends a corresponding dimming instruction to the glass assembly 2 according to the touch signal.

The touch unit 121 may be a capacitive touch unit 121, that is, each touch unit 121 includes a driving electrode and a receiving electrode. When there is a touch, a capacitance between the driving electrode and the receiving electrode changes, and the touch signal is sent from the receiving electrode of the touch unit 121 to the first controller 13. A change of the capacitance between the driving electrode and the receiving electrode is analyzed by the first controller 13 based on the touch signal. After the change of the capacitance is detected, a corresponding dimming instruction is sent from the first controller 13 to the glass assembly 2, such that the glass assembly 2 adjusts the light transmittance based on the dimming instruction.

In the embodiment of the present disclosure, the first controller 13 may be a control chip such as a Micro Controller Unit (MCU), a Central Processing Unit (CPU), and the like.

Further, in some embodiments of the present disclosure, the first controller 13 may control the driving units 112 to drive a part of the pixel units 111 for display, so as to generate a plurality of light emitting points. The touch units 121 in the touch component 12 are at least provided corresponding to areas where the light emitting points are located. That is, the touch unit 121 is provided at a position where a light emitting point is located. Moreover, in the embodiment of the present disclosure, the touch unit 121 provided at the position where a light emitting point is located sends a touch signal to the first controller 13 after receiving the touch instruction. At this time, the first controller 13 generates different dimming instructions according to the touch signals sent by the touch units 121 at different positions, such that the glass assembly 2 can adjust the light transmittance based on the dimming instructions. In short, each light emitting point is equivalent to a touch dimming button.

In short, if the first controller 13 controls the driving units 112 to drive the corresponding pixel units 111 for display and three light emitting points in total are generated, the three light emitting points may be arranged side by side at intervals. A group of touch units 121 is provided at a position corresponding to each single point (each group of touch units 121 includes a plurality of touch units 121 arranged in an array). When the group of touch units 121 corresponding to a first light emitting point receives the touch instruction, a corresponding touch signal is sent to the first controller 13 by the group of touch units 121. The first controller 13 sends a first dimming instruction to the glass assembly 2 based on the received touch signal and a correspondence relationship between the group of touch units 121 (or the light emitting points) and the dimming instruction, which is pre-stored in the first controller. Then, the glass assembly 2 adjusts its light transmittance based on the first dimming instruction. Similarly, after the groups of touch units 121 corresponding to a second light emitting point and a third light emitting point receive the touch instructions, the light transmittance of the glass assembly 2 is adjusted based on the above method. The difference between the first, second and third light emitting points is that the dimming instructions corresponding to the positions of the light emitting points at the three positions are different, that is, the light transmittance of the glass assembly 2 at different light emitting points is different after being adjusted. In other words, a plurality of light emitting points corresponds to a plurality of light transmittances.

In some embodiments of the present disclosure, in order to prevent the touch display assembly 1 from affecting the overall glass function of the intelligent glass, preferably, the touch display assembly 1 is designed as a transparent touch display assembly 1, in this way, the light emitting device in the corresponding pixel unit 111 and the touch device in the touch unit 121 both adopt transparent functional devices.

Figure 4:
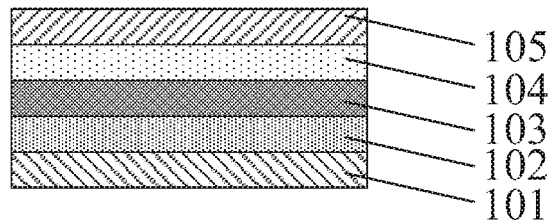
FIG. 4 is a schematic diagram of a structure of a light emitting device according to an embodiment of the disclosure.

In the present embodiment, the light emitting device in the pixel unit 111 may be an electroluminescent device, that is, a material of the light emitting device is an electroluminescent (EL) material. FIG. 4 is a schematic diagram of a structure of a light emitting device according to an embodiment of the disclosure. Referring to FIG. 4, the electroluminescent device may include a lower electrode 101, a lower dielectric layer 102, an electroluminescent material layer 103, an upper dielectric layer 104, and an upper electrode 105, which are sequentially provided on a substrate.

It should be noted that, electroluminescence is an optical and electrical phenomenon occurring when a current passes through a material or a strong electric field passes through the material, light is emitted from the material. An electroluminescent display (ELD) is a display technology that uses an electroluminescent material (such as GaAs) sandwiched between two conductors. When a current passes through, the material radiates visible light. When a current passes through the electroluminescent material, the electroluminescent material emits light due to excitation of atoms. With different electroluminescent materials, light of different colors can be emitted. In fact, an electroluminescent device includes flat electrodes which are mutually parallel to each other, and an electroluminescent material. The top layer must be light transmissive, and therefore let light passing therethrough.

The electroluminescent device is driven to emit light as follows: the first controller 13 controls the driving unit 112 to apply an alternating current to the upper electrode and the lower electrode of the electroluminescent device to generate an electric field, and electrons excited by the electric field collide with fluorescent substance in the electroluminescent material layer to cause electron energy level transition, change and recombination to emit cold light with high efficiency, i.e., to realize light emission of the electroluminescent device. As long as an alternating voltage is applied to the upper electrode and the lower electrode of the electroluminescent device in the pixel unit 111, the electroluminescent device of the pixel unit 111 can be lit.

In some embodiments of the present disclosure, the touch unit 121 in the touch component 12 may specifically include a capacitive touch unit 121. Specifically, the capacitive touch unit 121 may be a mutual-capacitive touch unit 121 or a self-capacitive touch unit 121. When the touch unit 121 is a mutual-capacitive touch unit 121, it includes a driving electrode and a sensing electrode. When the touch unit 121 is a self-capacitive touch unit 121, it includes a touch electrode. No matter the touch unit 121 is a mutual-capacitive touch unit 121 or a self-capacitive touch unit 121, in order to ensure the light transmittance of the intelligent glass, the touch unit 121 is preferably designed as a transparent touch unit 121, that is, the electrode structure in the touch unit 121 is made of a transparent conductive material.

Figure 5:
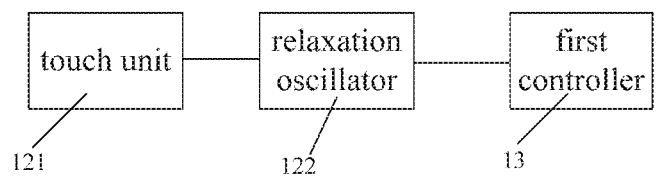
FIG. 5 is a schematic diagram of a structure for implementation of a touch function according to an embodiment of the present disclosure.

FIG. 5 is a schematic diagram of a structure illustrating implementation of a touch function according to an embodiment of the present disclosure. Referring to FIG. 5, the touch component 12 may include not only the touch unit 121 but also a relaxation oscillator 122. The relaxation oscillator 122 is coupled between the touch unit 121 and the first controller 13. Therefore, when a user touches the touch unit 121, that is, the touch unit 121 receives a touch instruction, the capacitance of the touch unit 121 changes, which changes a signal frequency of the relaxation oscillator. As long as the first controller 13 calculates the number of pulses in a fixed time, whether the user touches the touch unit 121 can be determined.

Figure 6:
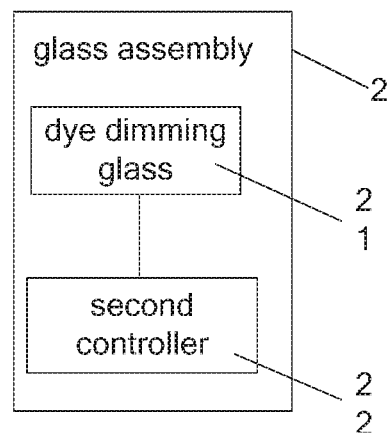
FIG. 6 is a schematic diagram of a structure of a glass assembly according to an embodiment of the present disclosure.

FIG. 6 is a schematic diagram of a structure of a glass assembly according to an embodiment of the present disclosure.

In some embodiments of the present disclosure, referring to FIG. 6, the glass assembly 2 may include a dye dimming glass 21 and a second controller 22. The second controller 22 is communicatively coupled to the first controller 13, and is configured to adjust the light transmittance of the dye dimming glass 21 based on the dimming instruction sent by the first controller 13.

The dimming glass 21 in the embodiment may be a dye dimming glass, and the dye dimming glass specifically includes: a first substrate and a second substrate opposite to each other, and a liquid crystal layer between the first substrate and the second substrate. One side of the first substrate proximal to the liquid crystal layer is provided with a first electrode, and one side of the second substrate proximal to the liquid crystal layer is provided with a second electrode. The dye dimming glass 21 is formed by attaching a dyeing material to liquid crystal molecules in the liquid crystal layer. When a voltage is applied between a first electrode and a second electrode to generate an electric field for driving the liquid crystal molecules to deflect, the light transmittance of the dye dimming glass 21 is adjusted.

Specifically, when the first controller 13 sends a dimming instruction to the second controller 22 based on the touch instruction, the second controller 22 applies a corresponding voltage to the first electrode and the second electrode of the dye dimming glass 21 based on the dimming instruction, so as to deflect the liquid crystal molecules of the liquid crystal layer, thereby implementing corresponding adjustment of the light transmittance of the dye dimming glass 21. Of course, in some embodiments of the present disclosure, an organic electrochromic dimming glass or an inorganic electrochromic dimming glass may be selected in the glass assembly. The type of the dimming glass is not limited in the embodiments of the present disclosure.

Figure 7:
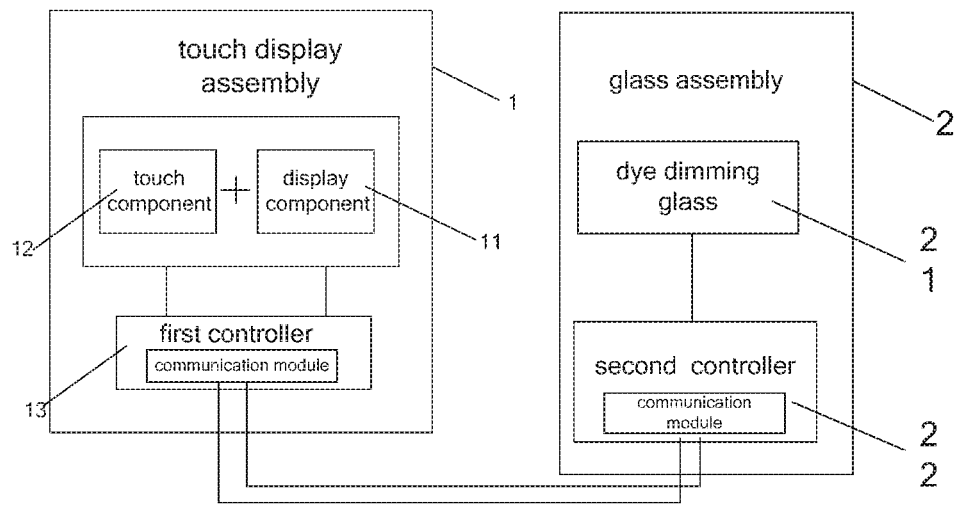
FIG. 7 is a schematic diagram illustrating connection between the touch display assembly and the glass assembly according to an embodiment of the present disclosure.

FIG. 7 is a schematic diagram illustrating connection between the touch display assembly and the glass assembly according to an embodiment of the present disclosure.

In some embodiments of the present disclosure, referring to FIG. 7, the first controller 13 in the touch display assembly 1 and the second controller 22 in the glass assembly 2 are coupled to each other by a bus 3, which may be a CAN bus 3, but the present disclosure is not limited thereto.

It should be noted that, since the first controller 13 and the second controller 22 can be communicatively coupled to each other, a communication module should be provided in each of the first controller 13 and the second controller 22. If the first controller 13 and the second controller 2 are communicatively coupled to each other by a CAN bus 3, a CAN module is provided in each of the first controller 13 and the second controller 22.

In a case that the first controller 13 and the second controller 22 are communicating with each other by a CAN bus 3, a RS485 module may be alternatively used as required. Specifically, the communication module in the second controller is a master device of the RS485 module, and the communication module in the first controller 13 is a slave device of the RS485 module. In such a way, the master device constantly monitors whether the slave device sends a dimming instruction, and when receiving the dimming instruction, the light transmittance of the glass assembly 2 is adjusted.

Certainly, the first controller 13 and the second controller 22 in the embodiment of the present disclosure may also be integrated in a same controller. The first controller 13 and the second controller 22 in the embodiment is not limited thereto.

In some embodiments of the present disclosure, the touch display assembly 1 and the glass assembly 2 may be stacked together, Specifically, if the touch display assembly 1 is provided with light emitting points for dimming control of the glass assembly 2, the touch display assembly 1 may be arranged at a corner of the glass assembly 2 to facilitate light adjustment by a user.

Certainly, the touch display assembly 1 and the glass assembly 2 may also be coupled to each other in a splicing structure. The position relationship between the touch display assembly and the glass assembly is not limited in the embodiment.

Figure 8:
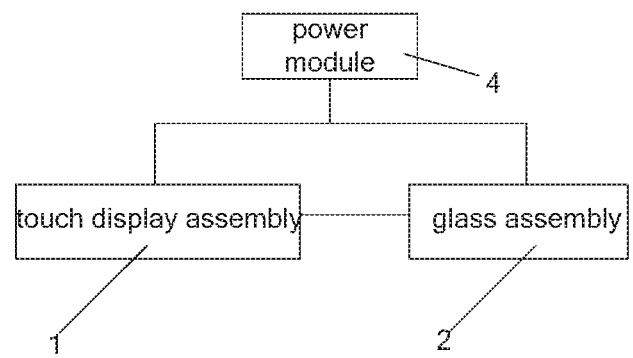
FIG. 8 is a schematic diagram of another structure of an intelligent glass according to an embodiment of the present disclosure and FIG. 9 is a schematic diagram of a specific structure of a power module according to an embodiment of the disclosure.

FIG. 8 is a schematic diagram of another structure of an intelligent glass according to an embodiment of the present disclosure.

In some embodiments of the present disclosure, referring to FIG. 8, the intelligent glass not only includes the touch display assembly 1 and the glass assembly 2, but also includes a power module 4. The power module 4 is configured to provide operating voltages for the touch display assembly 1 and the glass assembly 2, respectively.

Specifically, the power module may include a power unit and a power isolator. The power unit is used for providing a standard power supply voltage; and the power isolator is used for isolating the voltage higher than the standard power supply voltage and converting the standard power supply voltage respectively into the voltages required by the touch display assembly 1 and the glass assembly 2.

Figure 9:
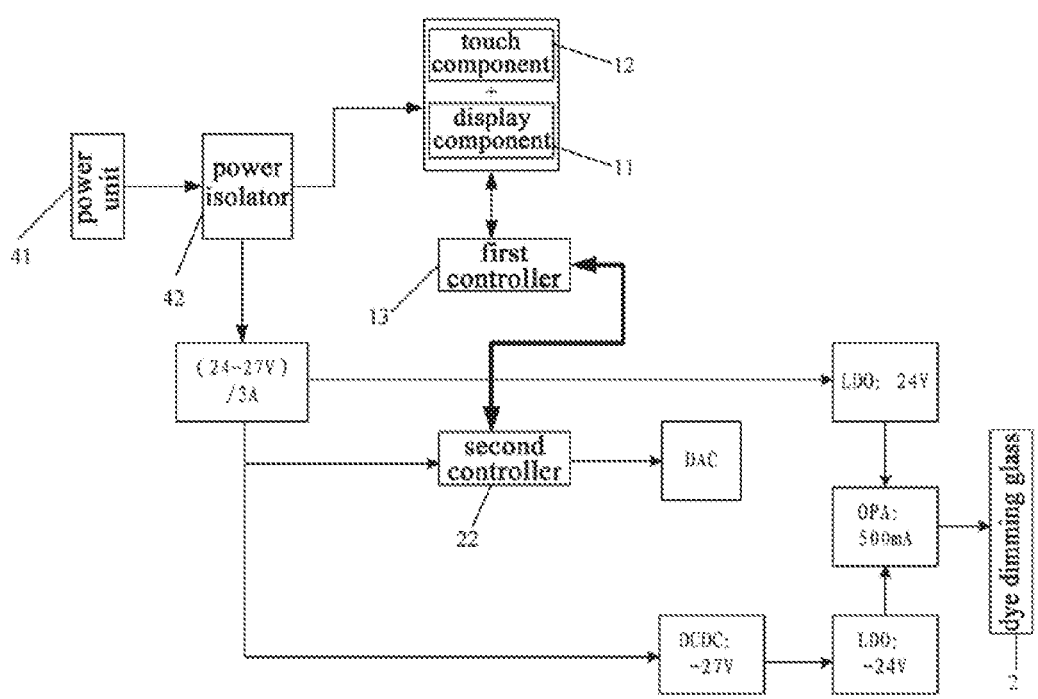

As an example, the intelligent glass in the embodiment of the disclosure is used for a window of a motor. FIG. 9 is a schematic diagram of a structure of a power module according to an embodiment of the disclosure. Referring to FIG. 9, an 110V power supply in the motor is used as a power unit, and the 110V voltage output by the power module 4 is the standard power supply voltage. The power isolator isolates the voltage higher than 110V, so as to prevent high voltage short pulses generated when a motor is powered up from bringing destructive influence on a control system. The 110V voltage provides a corresponding power supply voltage for a light emitting device according to the power supply specification of the light emitting device in the touch display assembly 1. For example, when the light emitting device is an electroluminescent device, an alternating power supply needs to be provided for the light emitting device. Meanwhile, the 110V voltage provides the required power supply voltage for the whole intelligent glass system. Specifically, a power voltage of 110V is converted into a power voltage of (24V-27V)/3A by the power isolator, and the power voltage of (24V-27V)/3A is output to the first controller in the touch display assembly and the second controller in the glass assembly for supplying power. On the basis of the 24V power voltage, for the glass assembly, in addition to 3.3V and 2.5V voltages necessary for the second controller and a digital-to-analog converter, 24V and −24V voltages need to be generated through a 27V voltage. The positive and negative 24V and −24V voltages are used for an operational amplifier (OPA), such that the maximum amplitude of the OPA output voltage is ±24V. For the touch display assembly, in addition to the 3.3V voltage required by the EL controller, a constant alternating voltage of 12V for the touch display assembly needs to be generated to drive the touch display assembly to perform display.

In order to make the function of the intelligent glass in the embodiment of the present disclosure more clear, the following description is made with reference to a control method of the intelligent glass.

For the touch display assembly 1, after the touch display assembly 1 is powered up, the touch display assembly 1 starts to work.

The first controller 13 detects whether the light emitting point on the touch display assembly 1 is touched in real time. When a certain light emitting point is detected to be touched, the following steps will be performed, and if not, the detection will be continued.

When a certain light emitting point is detected to be touched, a light transmittance corresponding to the dimming instruction corresponding to the light emitting point is judged.

Whether the light transmittance corresponding to the dimming instruction is the same as the current light transmittance of the glass assembly 2 is judged. If the judgment result is "difference", the following steps are performed; if the judgment result is "same", whether a certain light emitting point is touched or not is continuously detected.

If the light transmittance corresponding to the dimming instruction is different from the current light transmittance of the glass assembly 2, the dimming instruction is sent to the glass assembly 2 through the bus 3.

For the glass assembly 2, after the glass assembly 2 is powered on, the glass assembly 2 starts to operate.

The second controller 22 determines whether the bus 3 receives a dimming instruction.

When the dimming instruction is received, the light transmittance of the glass assembly 2 is adjusted based on the dimming instruction by the second controller 22.

In a second aspect, an embodiment of the present disclosure further provides an intelligent window system including the intelligent glass.

The intelligent window system can be applied to traffic facilities such as automobiles, trains, airplanes and the like.

Since the intelligent window system includes the intelligent glass above, and the intelligent glass includes the touch display assembly 1, the light transmittance of the glass assembly 2 can be adjusted in a touch manner, such that the light transmittance of the intelligent glass can be adjusted more conveniently, and the intelligent glass can be applicable to more fields. Moreover, as the name implies, the touch display assembly 1 not only has a touch function, but also has a display function. That is, the intelligent glass in the embodiment of the present disclosure not only has an adjustable light transmittance, but also has a display function, such that user experience can be improved.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the disclosure, and such modifications and improvements are also considered to be within the scope of the disclosure.

What is claimed is:

1. An intelligent glass, comprising a touch display assembly and a glass assembly,
   wherein the touch display assembly is communicatively coupled to the glass assembly, and is configured to send a corresponding dimming instruction to the glass assembly based on a received touch instruction, such that the glass assembly adjusts its light transmittance based on the dimming instruction;
   wherein the touch display assembly comprises a touch component, a display component and a first controller;
   the display component comprises a plurality of pixel units and a plurality of driving units, wherein the driving units are configured to drive the pixel units for display under control of the first controller; and
   the touch component comprises a plurality of touch units, wherein the plurality of touch units are configured to send a corresponding touch signal to the first controller based on the received touch instruction, such that the first controller sends the dimming instruction to the glass assembly based on the touch signal;
   wherein the first controller is configured to control the driving units to drive the pixel units to generate a plurality of light emitting points; each of the touch units is provided at a position where a light emitting point of the light emitting points is located, and the plurality of light emitting points correspond to a plurality of light transmittances, respectively; and
   the first controller is configured to generate and send different dimming instructions according to the touch signals sent by the touch units at different positions where different light emitting points are located,
   wherein the glass assembly comprises a dye dimming glass and a second controller; and
   the second controller is communicatively coupled to the first controller, and is configured to adjust light transmittance of the dye dimming glass based on the dimming instruction sent by the first controller,
   wherein after the touch display assembly is powered up, when the first controller detects a light emitting point on the touch display assembly is touched, a light transmittance corresponding to the dimming instruction corresponding to the light emitting point is then judged whether it is identical to a current light transmittance of the glass assembly or not, and if NOT, the dimming instruction is sent to the glass assembly; if YES, whether any other light emitting point is touched or not is continuously detected; and
   after the glass assembly is powered up, the second controller determines whether a dimming instruction is received from the first controller, and when the dimming instruction is received, the light transmittance of the glass assembly is adjusted based on the dimming instruction by the second controller.

2. The intelligent glass of claim 1, wherein the pixel unit comprises a light emitting device, and the light emitting device comprises an electroluminescent device.

3. The intelligent glass of claim 1, wherein the touch unit comprises a capacitive touch unit.

4. The intelligent glass of claim 1, wherein the first controller and the second controller are coupled to each other by a bus.

5. The intelligent glass of claim 1, wherein the first controller and the second controller are integrated in a same controller.

6. The intelligent glass of claim 1, wherein the intelligent glass further comprises a power module configured to supply power to the touch display assembly and the glass assembly.

7. The intelligent glass of claim 6, wherein the power module comprises:
   a power unit configured to supply a standard power supply voltage; and
   a power isolator configured to isolate a voltage higher than the standard power supply voltage, and to convert the standard power supply voltage into a voltage required by the touch display assembly and the glass assembly.

8. The intelligent glass of claim 1, wherein the touch display assembly comprises a transparent touch display assembly.

9. The intelligent glass of claim 1, wherein the touch display assembly is stacked on the glass assembly.

10. The intelligent glass of claim 1, wherein the glass assembly comprises any one of a dye liquid crystal dimming glass, an organic electrochromic dimming glass, and an inorganic electrochromic dimming glass.

11. An intelligent window system, comprising the intelligent glass of claim 1.

12. The intelligent window system of claim 11, wherein the pixel unit comprises a light emitting device, and the light emitting device comprises an electroluminescent device.

13. The intelligent window system of claim 11, wherein the touch unit comprises a capacitive touch unit.

14. The intelligent window system of claim 11, wherein the first controller and the second controller are coupled to each other by a bus.

* * * * *